United States Patent

Kahn et al.

Patent Number: 6,122,614
Date of Patent: Sep. 19, 2000

[54] SYSTEM AND METHOD FOR AUTOMATING TRANSCRIPTION SERVICES

[75] Inventors: Jonathan Kahn; Thomas P. Flynn, both of Crown Point, Ind.; Charles Qin, Lake Zurich; Robert J. Tippe, Matteson, both of Ill.

[73] Assignee: Custom Speech USA, Inc., Crown Point, Ind.

[21] Appl. No.: 09/197,313

[22] Filed: Nov. 20, 1998

[51] Int. Cl.[7] .............................. G01L 15/18; G01L 15/26
[52] U.S. Cl. ..................... 704/235; 704/260; 704/275; 704/270; 704/257
[58] Field of Search .................................. 704/260, 270, 704/275, 257, 277, 278, 235

[56] References Cited

U.S. PATENT DOCUMENTS

| | | | |
|---|---|---|---|
| 4,375,083 | 2/1983 | Maxemchuk | 364/900 |
| 4,430,726 | 2/1984 | Kasday | 364/900 |
| 5,179,627 | 1/1993 | Sweet et al. | 704/200 |
| 5,481,645 | 1/1996 | Bertino et al. | 704/270 |
| 5,526,407 | 6/1996 | Russell et al. | 379/89 |
| 5,799,273 | 8/1998 | Mitchell et al. | 704/235 |
| 5,875,448 | 2/1999 | Boys et al. | 707/531 |
| 5,995,936 | 11/1999 | Brais et al. | 704/275 |

*Primary Examiner*—David R. Hudspeth
*Assistant Examiner*—Vijay Chawan
*Attorney, Agent, or Firm*—Sonnenschein Nath & Rosenthal

[57] ABSTRACT

A system for substantially automating transcription services for multiple voice users including a manual transcription station, a speech recognition program and a routing program. The system establishes a profile for each of the voice users containing a training status which is selected from the group of enrollment, training, automated and stop automation. When the system receives a voice dictation file from a current voice user based on the training status the system routes the voice dictation file to a manual transcription station and the speech recognition program. A human transcriptionist creates transcribed files for each received voice dictation files. The speech recognition program automatically creates a written text for each received voice dictation file if the training status of the current user is training or automated. A verbatim file is manually established if the training status of the current user is enrollment or training and the speech recognition program is trained with an acoustic model for the current user using the verbatim file and the voice dictation file if the training status of the current user is enrollment or training. The transcribed file is returned to the current user if the training status of the current user is enrollment or training or the written text is returned if the training status of the current user is automated. An apparatus and method is also disclosed for simplifying the manual establishment of the verbatim file. A method for substantially automating transcription services is also disclosed.

32 Claims, 7 Drawing Sheets

SYSTEM AND METHOD FOR AUTOMATING TRANSCRIPTION SERVICES

BACKGROUND OF THE INVENTION

1. Field of the Invention

The present invention relates in general to computer speech recognition systems and, in particular, to a system and method for automating the text transcription of voice dictation by various end users.

2. Background Art

Speech recognition programs are well known in the art. While these programs are ultimately useful in automatically converting speech into text, many users are dissuaded from using these programs because they require each user to spend a significant amount of time training the system. Usually this training begins by having each user read a series of pre-selected materials for approximately 20 minutes. Then, as the user continues to use the program, as words are improperly transcribed the user is expected to stop and train the program as to the intended word thus advancing the ultimate accuracy of the acoustic model. Unfortunately, most professionals (doctors, dentists, veterinarians, lawyers) and business executive are unwilling to spend the time developing the necessary acoustic model to truly benefit from the automated transcription.

Accordingly, it is an object of the present invention to provide a system that offers transparent training of the speech recognition program to the end-users.

There are systems for using computers for routing transcription from a group of end users. Most often these systems are used in large multi-user settings such as hospitals. In those systems, a voice user dictates into a general-purpose computer or other recording device and the resulting file is transferred automatically to a human transcriptionist. The human transcriptionist transcribes the file, which is then returned to the original "author" for review. These systems have the perpetual overhead of employing a sufficient number of human transcriptionist to transcribe all of the dictation files.

Accordingly it is another object of the present invention to provide an automated means of translating speech into text where ever suitable so as to minimize the number of human transcriptionist necessary to transcribe audio files coming into the system.

It is an associated object to provide a simplified means for providing verbatim text files for training a user's acoustic model for the speech recognition portion of the system.

It is another associated object of the present invention to automate a preexisting speech recognition program toward further minimizing the number operators necessary to operate the system.

These and other objects will be apparent to those of ordinary skill in the art having the present drawings, specification and claims before them.

SUMMARY OF THE INVENTION

The present invention comprises, in part, a system for substantially automating transcription services for one or more voice users. The system includes means for receiving a voice dictation file from a current user and an audio player used to audibly reproduce said voice dictation file. Both of these system elements can be implemented on the same or different general-purpose computers. Additionally, the voice dictation file receiving means may include an audio recorder, means for operably connecting to a separate digital recording device and/or means for reading audio files from removable magnetic and other computer media.

Each of the general purpose computers implementing the system may be remotely located from the other computers but in operable connection to each other by way of a computer network, direct telephone connection, via email or other Internet based transfer.

The system further includes means for manually inputting and creating a transcribed file based on humanly perceived contents of the voice dictation file. Thus, for certain voice dictation files, a human transcriptionist manually transcribes a textual version of the audio—using a text editor or word processor—based on the output of the output of the audio player.

The system also includes means for automatically converting the voice dictation file into written text. The automatic speech converting means may be a preexisting speech recognition program, such as Dragon Systems' Naturally Speaking, IBM's Via Voice or Philips Corporation's Magic Speech. In such a case, the automatic speech converting means includes means for automating responses to a series of interactive inquiries from the preexisting speech recognition program. In one embodiment, the system also includes means for manually selecting a specialized language model.

The system further includes means for manually editing the resulting written text to create a verbatim text of the voice dictation file. At the outset of a users use of the system, this verbatim text will have to be created completely manually. However, after the automatic speech converting means has begun to sufficiently develop that user's acoustic model a more automated means can be used.

In a preferred embodiment, that manual editing means includes means for sequentially comparing a copy of the written text with the transcribed file resulting in a sequential list of unmatched words culled from the copy of said written text. The manual editing means further includes means for incrementally searching for the current unmatched word contemporaneously within a first buffer associated with the speech recognition program containing the written text and a second buffer associated with the sequential list. Finally, the preferred manual editing means includes means for correcting the current unmatched word in the second buffer, which includes means for displaying the current unmatched word in a manner substantially visually isolated from other text in the written text and means for playing a portion of the voice dictation recording from said first buffer associated with said current unmatched word. In one embodiment, the manual input means further includes means for alternatively viewing the current unmatched word in context within the written text. For instance, the operator may wish to view the unmatched within the sentence in which it appears or perhaps with only is immediately adjacent words. Thus, the manner substantially visual isolation can be manually selected from the group containing word-by-word display, sentence-by-sentence display, and said current unmatched word display. The manual editing means portion of the complete system may also be utilized as a separate apparatus.

The system may also include means for determining an accuracy rate for the current user. In one approach, this accuracy determination can be made by determining the ratio of the number of words in the sequential list of unmatched words to the number of words in the written text.

The system additionally includes means for training the automatic speech converting means to achieve higher accuracy for the current user. In particular, the training means uses the verbatim text created by the manual editing means and the voice dictation file **. The training means may also comprise a preexisting training portion of the preexisting speech recognition program. Thus, the training means would also include means for automating responses to a series of interactive inquiries from the preexisting training portion of the speech recognition program.

The system finally includes means for controlling the flow of the voice dictation file based upon the training status of the current user. said voice dictation file to at least one of said manual input means and said automatic speech converting means. The control means reads and modifies a user's training status such that it is an appropriate selection from the group of pre-enrollment, enrollment, training, automation and stop automation. During a user's pre-enrollment phase the control means further includes means for creating a user identification and acoustic model within the automatic speech converting means. During this phase, the control means routes the voice dictation file to the automatic speech converting means and the manual input means, routes the written text and the transcribed file to the manual editing means, routes the verbatim text to the training means and routes the transcribed file back to the current user as a finished text.

During the training phase, the control means routes (1) the voice dictation file to the automatic speech converting means and the manual input means, (2) routes the written text and the transcribed file to the manual editing means, (3) routes the verbatim text to the training means and (4) routes the transcribed file back to the current user as a finished text.

During the automation stage, the control means routes (1) the voice dictation file only to the automatic speech converting means and (2) the written text back to the current user as a finished text.

The present application also discloses a method for automating transcription services for one or more voice users in a system including a manual transcription station and a speech recognition program. The method comprising the steps of: (1) establishing a profile for each of the voice users, the profile containing a training status; (2) receiving a voice dictation file from a current voice user; (3) choosing the training status of the current voice user from the group of enrollment, training, automated and stop automation; (4) routing the voice dictation file to at least one of the manual transcription station and the speech recognition program based on the training status; (5) receiving the voice dictation file in at least one of the manual transcription station and the speech recognition program; (6) creating a transcribed file at the manual transcription station for each received voice dictation file; (7) automatically creating a written text with the speech recognition program for each received voice dictation file if the training status of the current user is training or automated; (8) manually establishing a verbatim file if the training status of the current user is enrollment or training; (9) training the speech recognition program with an acoustic model for the current user using the verbatim file and the voice dictation file if the training status of the current user is enrollment or training; (10) returning the transcribed file to the current user if the training status of the current user is enrollment or training; and (11) returning the written text to the current user if the training status of the current user is automated.

This method may also include the various substeps in the step of manually establishing a verbatim file which include: (1) assisting an operator to establish the verbatim file if the training status of the current user is training by: (a) sequentially comparing a copy of the written text with the transcribed file resulting in a sequential list of unmatched words culled from the copy of the written text, the sequential list having a beginning, an end and a current unmatched word, the current unmatched word being successively advanced from the beginning to the end; (b) incrementally searching for the current unmatched word contemporaneously within a first buffer associated with the speech recognition program containing the written text and a second buffer associated with the sequential list; (c) displaying the current unmatched word in a manner substantially visually isolated from other text in the copy of the written text and playing a portion of the synchronized voice dictation recording from the first buffer associated with the current unmatched word; and (d) correcting the current unmatched word to be a verbatim representation of the portion of the synchronized voice dictation recording.

The invention also includes a method for assisting an operator to establish a verbatim file from a written text created by a speech recognition program and a transcribed file created by a human transcriptionist, the method comprising the steps of: (1) sequentially comparing a copy of the written text with the transcribed file resulting in a sequential list of unmatched words culled from the copy of the written text, the sequential list having a beginning, an end and a current unmatched word, the current unmatched word being successively advanced from the beginning to the end; (2) incrementally searching for the current unmatched word contemporaneously within a first buffer associated with the speech recognition program containing the written text and a second buffer associated with the sequential list; (3) displaying the current unmatched word in a manner substantially visually isolated from other text in the copy of the written text and playing a portion of the synchronized voice dictation recording from the first buffer associated with the current unmatched word; and (4) correcting the current unmatched word to be a verbatim representation of the portion of the synchronized voice dictation recording.

BEST MODES OF PRACTICING THE INVENTION

Figure 1:
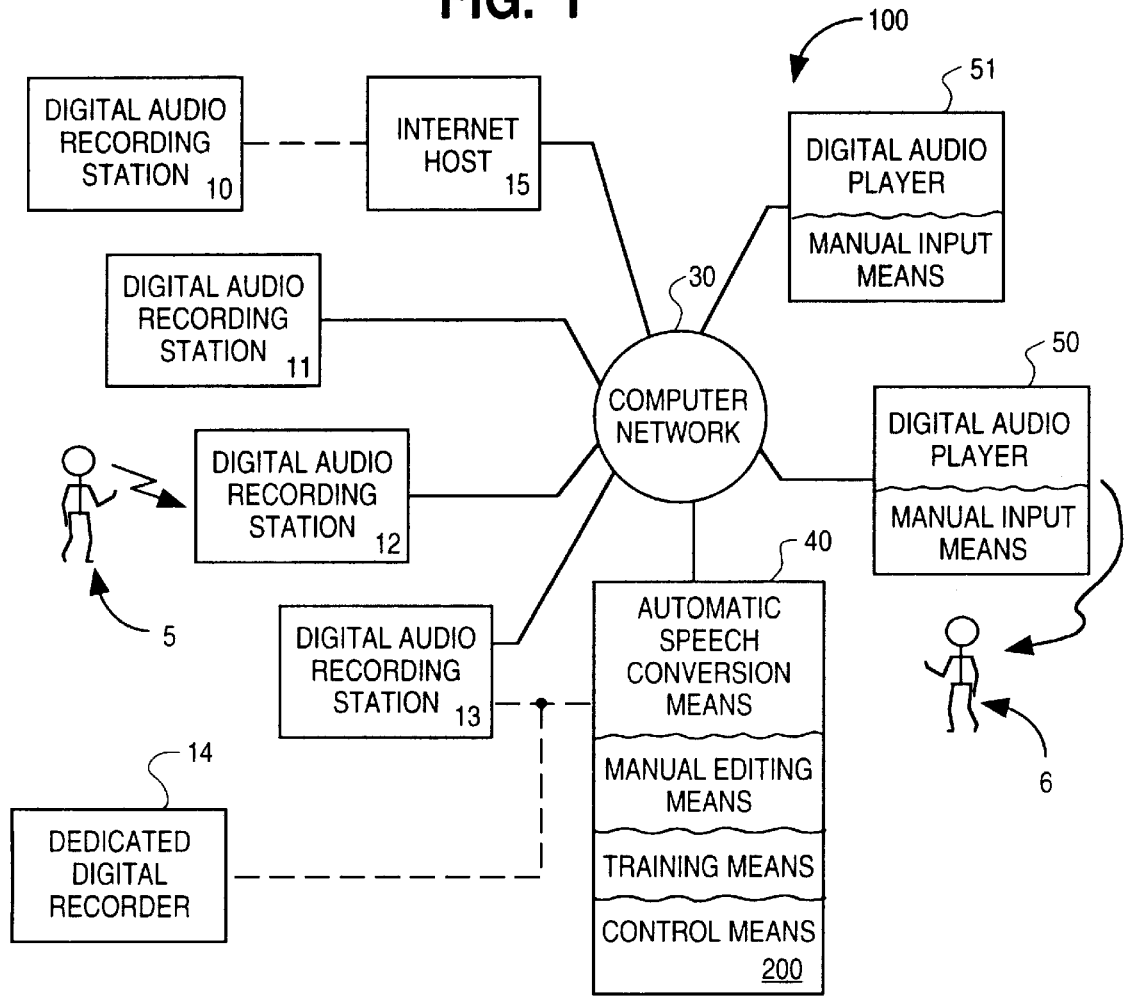
FIG. 1 of the drawings is a block diagram of one potential embodiment of the present system for substantially automating transcription services for one or more voice users.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

FIG. 1 of the drawings generally shows one potential embodiment of the present system for substantially automating transcription services for one or more voice users. The present system must include some means for receiving a voice dictation file from a current user. This voice dictation file receiving means can be a digital audio recorder, an analog audio recorder, or standard means for receiving computer files on magnetic media or via a data connection.

As shown, in one embodiment, the system 100 includes multiple digital recording stations 10, 11, 12 and 13. Each digital recording station has at least a digital audio recorder and means for identifying the current voice user.

Preferably, each of these digital recording stations is implemented on a general-purpose computer (such as computer 20), although a specialized computer could be developed for this specific purpose. The general-purpose computer, though has the added advantage of being adaptable to varying uses in addition to operating within the present system 100. In general, the general-purpose computer should have, among other elements, a microprocessor (such as the Intel Corporation PENTIUM, Cyrix K6 or Motorola 68000 series); volatile and non-volatile memory; one or more mass storage devices (i.e. HDD (not shown), floppy drive 21, and other removable media devices 22 such as a CD-ROM drive, DITTO, ZIP or JAZ drive (from Iomega Corporation) and the like); various user input devices, such as a mouse 23, a keyboard 24, or a microphone 25; and a video display system 26. In one embodiment, the general-purpose computer is controlled by the WINDOWS 9.x operating system. It is contemplated, however, that the present system would work equally well using a MACINTOSH computer or even another operating system such as a WINDOWS CE, UNIX or a JAVA based operating system, to name a few.

Regardless of the particular computer platform used, in an embodiment utilizing an analog audio input (via microphone 25) the general-purpose computer must include a sound-card (not shown). Of course, in an embodiment with a digital input no sound card would be necessary.

In the embodiment shown in FIG. 1, digital audio recording stations 10, 11, 12 and 13 are loaded and configured to run digital audio recording software on a PENTIUM-based computer system operating under WINDOWS 9.x. Such digital recording software is available as a utility in the WINDOWS 9.x operating system or from various third party vendor such as The Programmers' Consortium, Inc. of Oakton, Va. (VOICEDOC), Syntrillium Corporation of Phoenix, Ariz. (COOL EDIT) or Dragon Systems Corporation (Dragon Naturally Speaking Professional Edition). These various software programs produce a voice dictation file in the form of a "WAV" file. However, as would be known to those skilled in the art, other audio file formats, such as MP3 or DSS, could also be used to format the voice dictation file, without departing from the spirit of the present invention. In one embodiment where VOICEDOC software is used that software also automatically assigns a file handle to the WAV file, however, it would be known to those of ordinary skill in the art to save an audio file on a computer system using standard operating system file management methods.

Another means for receiving a voice dictation file is dedicated digital recorder 14, such as the Olympus Digital Voice Recorder D-1000 manufactured by the Olympus Corporation. Thus, if the current voice user is more comfortable with a more conventional type of dictation device, they can continue to use a dedicated digital recorder 14. In order to harvest the digital audio text file, upon completion of a recording, dedicated digital recorder 14 would be operably connected to one of the digital audio recording stations, such as 13, toward downloading the digital audio file into that general-purpose computer. With this approach, for instance, no audio card would be required.

Another alternative for receiving the voice dictation file may consist of using one form or another of removable magnetic media containing a pre-recorded audio file. With this alternative an operator would input the removable magnetic media into one of the digital audio recording stations toward uploading the audio file into the system.

In some cases it may be necessary to pre-process the audio files to make them acceptable for processing by the speech recognition software. For instance, a DSS file format may have to be changed to a WAV file format, or the sampling rate of a digital audio file may have to be upsampled or downsampled. For instance, in use the Olympus Digital Voice Recorder with Dragon Naturally Speaking, Olympus' 8 MHz rate needs to be upsampled to 11 MHz. Software to accomplish such pre-processing is available from a variety of sources including Syntrillium Corporation and Olympus Corporation.

The other aspect of the digital audio recording stations is some means for identifying the current voice user. The identifying means may include keyboard 24 upon which the user (or a separate operator) can input the current user's unique identification code. Of course, the user identification can be input using a myriad of computer input devices such as pointing devices (e.g. mouse 23), a touch screen (not shown), a light pen (not shown), bar-code reader (not shown) or audio cues via microphone 25, to name a few.

In the case of a first time user the identifying means may also assign that user an identification number after receiving potentially identifying information from that user, including: (1) name; (2) address; (3) occupation; (4) vocal dialect or accent; etc. As discussed in association with the control means, based upon this input information, a voice user profile and a sub-directory within the control means are established. Thus, regardless of the particular identification means used, a user identification must be established for each voice user and subsequently provided with a corresponding digital audio file for each use such that the control means can appropriately route and the system ultimately transcribe the audio.

In one embodiment of the present invention, the identifying means may also seek the manual selection of a specialty vocabulary. It is contemplated that the specialty vocabulary sets may be general for various users such as medical (i.e. Radiology, Orthopedic Surgery, Gynecology) and legal (i.e. corporate, patent, litigation) or highly specific such that within each specialty the vocabulary parameters could be further limited based on the particular circumstances of a particular dictation file. For instance, if the current voice user is a Radiologist dictating the reading of a abdominal CAT scan the nomenclature is highly specialized and different from the nomenclature for a renal ultrasound.

By narrowly segmenting each selectable vocabulary set an increase in the accuracy of the automatic speech converter is likely.

Figure 1B:
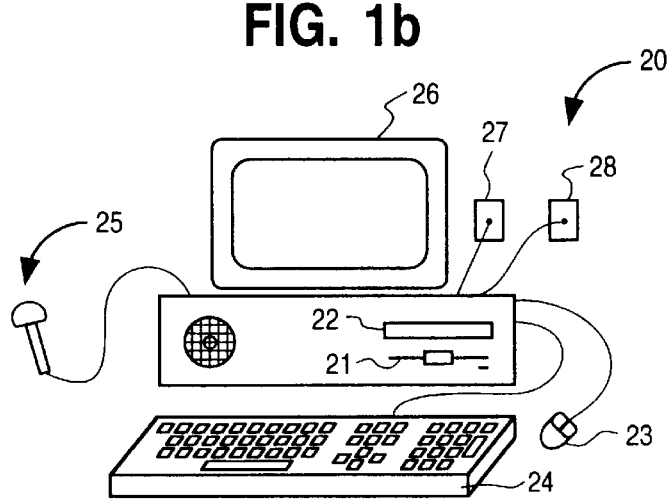
FIG. 1b of the drawings is a block diagram of a general-purpose computer which may be used as a dictation station, a transcription station and the control means within the present system.

As shown in FIG. 1, the digital audio recording stations may be operably connected to system 100 as part of computer network 30 or, alternatively, they may be operably connected to the system via internet host 15. As shown in FIG. 1b, the general-purpose computer can be connected to both network jack 27 and telephone jack. With the use of an internet host, connection may be accomplished by e-mailing the audio file via the Internet. Another method for completing such connection is by way of direct modem connection via remote control software, such as PC ANYWHERE, which is available from Symantec Corporation of Cupertino, Calif. It is also possible, if the IP address of digital audio recording station 10 or internet host 15 is known, to transfer the audio file using basic file transfer protocol. Thus, as can be seen from the foregoing, the present system allows great flexibility for voice users to provide audio input into the system.

Control means 200 controls the flow of voice dictation file based upon the training status of the current voice user. As shown in FIGS. 2a, 2b, 2c, 2d, control means 200 comprises a software program operating on general purpose computer 40. In particular, the program is initialized in step 201 where variable are set, buffers cleared and the particular configuration for this particular installation of the control means is loaded. Control means continually monitors a target directory (such as "current" (shown in FIG. 3)) to determine whether a new file has been moved into the target, step 202. Once a new file is found (such as "6723.id" (shown in FIG. 3)), a determination is made as to whether or not the current user 5 (shown in FIG. 1) is a new user, step 203.

For each new user (as indicated by the existence of a ".pro" file in the "current" subdirectory), a new subdirectory is established, step 204 (such as the "usern" subdirectory (shown in FIG. 3)). This subdirectory is used to store all of the audio files ("xxxx.wav"), written text ("xxxx.wrt"), verbatim text ("xxxx.vb"), transcription text ("xxxx.txt") and user profile ("usern.pro") for that particular user. Each particular job is assigned a unique number "xxxx" such that all of the files associated with a job can be associated by that number. With this directory structure, the number of users is practically limited only by storage space within general-purpose computer 40.

Figure 3:
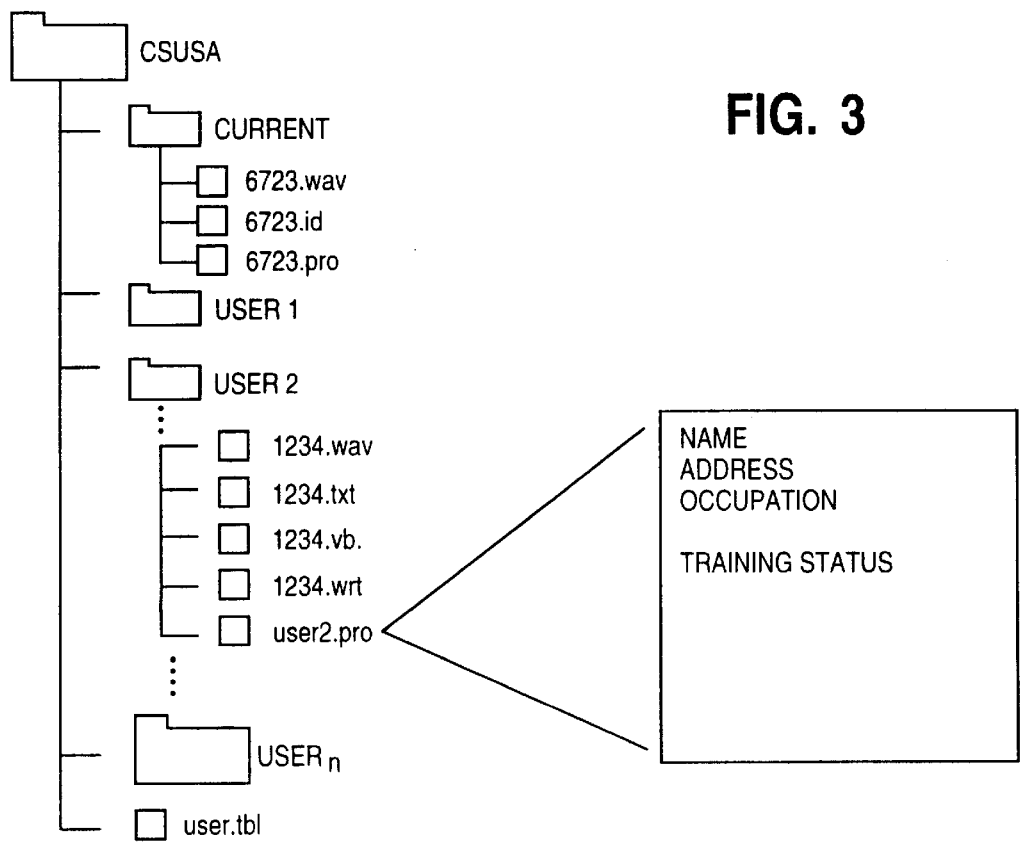
FIG. 3 of the drawings is a directory structure used by the control means in the present system.

Now that the user subdirectory has been established, the user profile is moved to the subdirectory, step 205. The contents of this user profile may vary between systems. The contents of one potential user profile is shown in FIG. 3 as containing: the user name, address, occupation and training status. Aside from the training status variable, which is necessary, the other data is useful in routing and transcribing the audio files.

The control means, having selected one set of files by the handle, determines the identity of the current user by comparing the ".id" file with its "user.tbl," step 206. Now that the user is known the user profile may be parsed from that user's subdirectory and the current training status determined, step 207. Steps 208–211 are the triage of the current training status is one of: enrollment, training, automate, and stop automation.

Figure 2A:
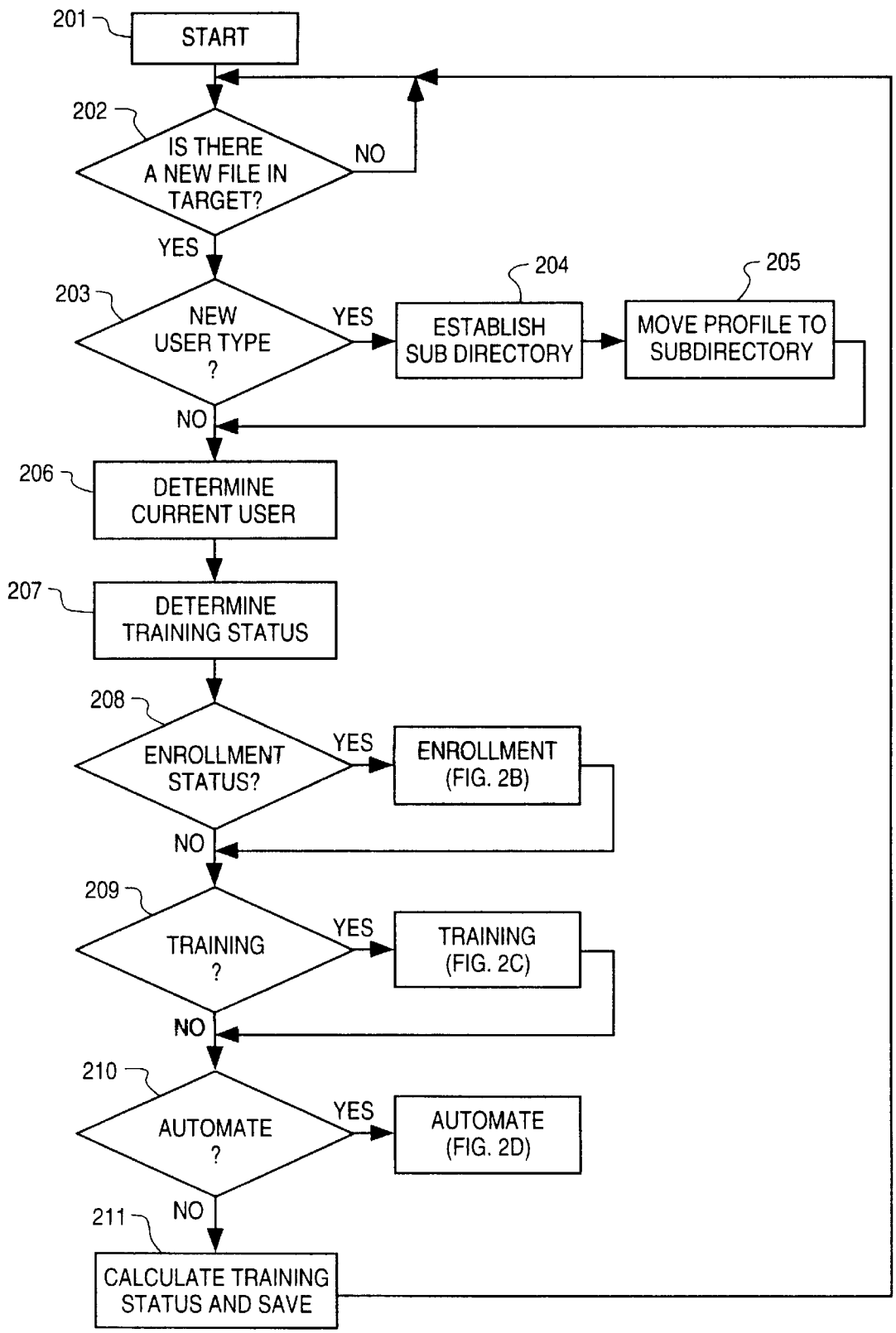
FIG. 2a of the drawings is a flow diagram of the main loop of the control means of the present system.
Figure 2B:
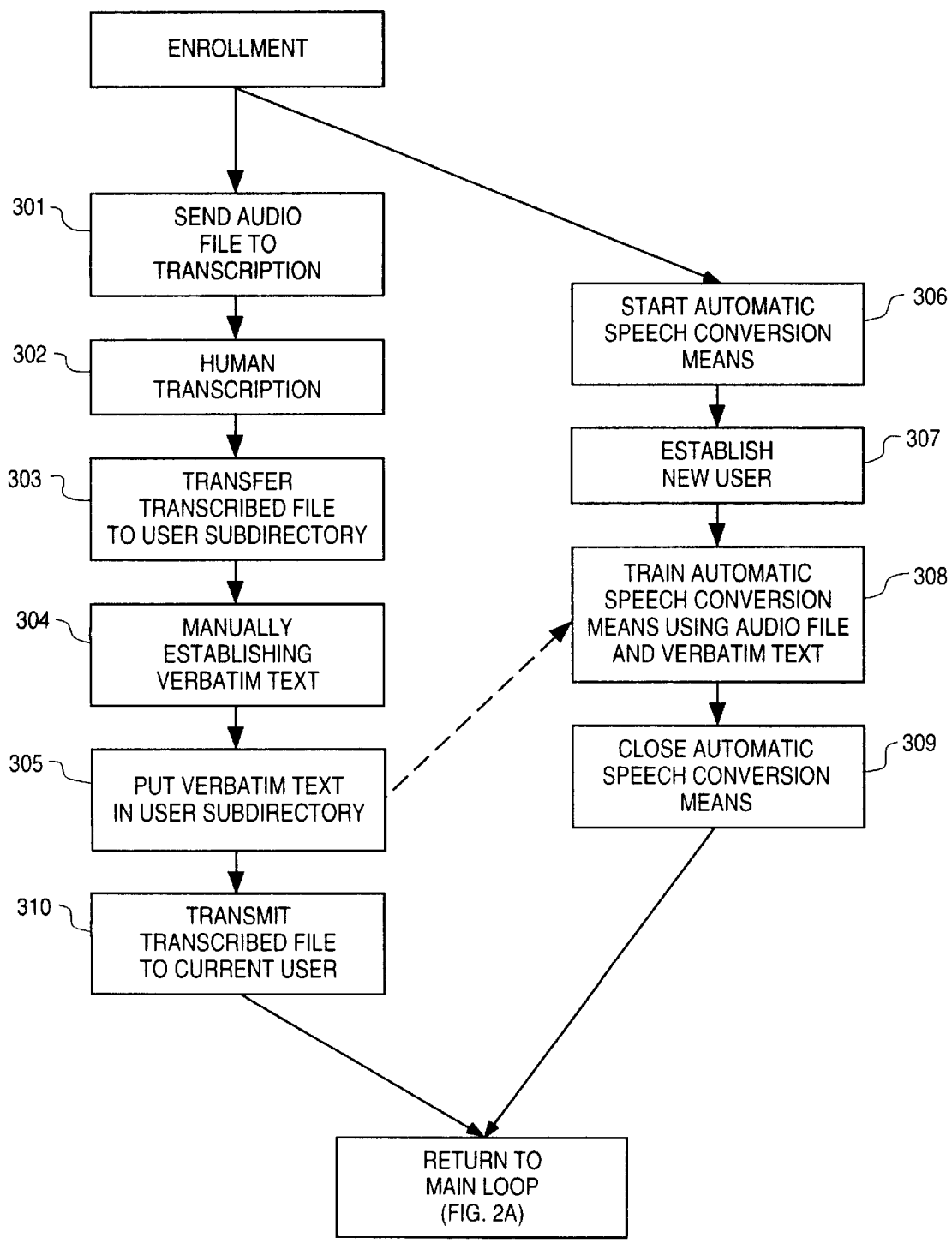
FIG. 2b of the drawings is a flow diagram of the enrollment stage portion of the control means of the present system.

Enrollment is the first stage in automating transcription services. As shown in FIG. 2b, the audio file is sent to transcription, step 301. In particular, the "xxxx.wav" file is transferred to transcriptionist stations 50 and 51. In a preferred embodiment, both stations are general-purpose computers, which run both an audio player and manual input means. The audio player is likely to be a digital audio player, although it is possible that an analog audio file could be transferred to the stations. Various audio players are commonly available including a utility in the WINDOWS 9.x operating system and various other third parties such from The Programmers' Consortium, Inc. of Oakton, Va. (VOICESCRIBE). Regardless of the audio player used to play the audio file, manual input means is running on the computer at the same time. This manual input means may comprise any of text editor or word processor (such as MS WORD, WordPerfect, AmiPro or Word Pad) in combination with a keyboard, mouse, or other user-interface device. In one embodiment of the present invention, this manual input means may, itself, also be speech recognition software, such as Naturally Speaking from Dragon Systems of Newton, Mass., Via Voice from IBM Corporation of Armonk, N.Y., or Speech Magic from Philips Corporation of Atlanta, Ga. Human transcriptionist 6 listens to the audio file created by current user 5 and as is known, manually inputs the perceived contents of that recorded text, thus establishing the transcribed file, step 302. Being human, human transcriptionist 6 is likely to impose experience, education and biases on the text and thus not input a verbatim transcript of the audio file. Upon completion of the human transcription, the human transcriptionist 6 saves the file and indicates that it is ready for transfer to the current users subdirectory as "xxxx.txt", step 303.

Inasmuch as this current user is only at the enrollment stage, a human operator will have to listen to the audio file and manually compare it to the transcribed file and create a verbatim file, step 304. That verbatim file "xxxx.vb" is also transferred to the current user's subdirectory, step 305. Now that verbatim text is available, control means 200 starts the automatic speech conversion means, step 306. This automatic speech conversion means may be a preexisting program, such as Dragon System's Naturally Speaking, IBM's Via Voice or Philips' Speech Magic, to name a few. Alternatively, it could be a unique program that is designed to specifically perform automated speech recognition.

In a preferred embodiment, Dragon Systems' Naturally Speaking has been used by running an executable simultaneously with Naturally Speaking that feeds phantom keystrokes and mousing operations through the WIN32API, such that Naturally Speaking believes that it is interacting with a human being, when in fact it is being controlled by control means 200. Such techniques are well known in the computer software testing art and, thus, will not be discussed in detail. It should suffice to say that by watching the application flow of any speech recognition program, an executable to mimic the interactive manual steps can be created.

If the current user is a new user, the speech recognition program will need to establish the new user, step 307. Control means provides the necessary information from the user profile found in the current user's subdirectory. All speech recognition require significant training to establish an acoustic model of a particular user. In the case of Dragon, initially the program seeks approximately 20 minutes of audio usually obtained by the user reading a canned text provided by Dragon Systems. There is also functionality built into Dragon that allows "mobile training." Using this feature, the verbatim file and audio file are fed into the speech recognition program to beginning training the acoustic model for that user, step 308. Regardless of the length of that audio file, control means 200 closes the speech recognition program at the completion of the file, step 309.

As the enrollment step is too soon to use the automatically created text, a copy of the transcribed file is sent to the current user using the address information contained in the user profile, step 310. This address can be a street address or an e-mail address. Following that transmission, the program returns to the main loop on FIG. 2*a*.

Figure 2C:
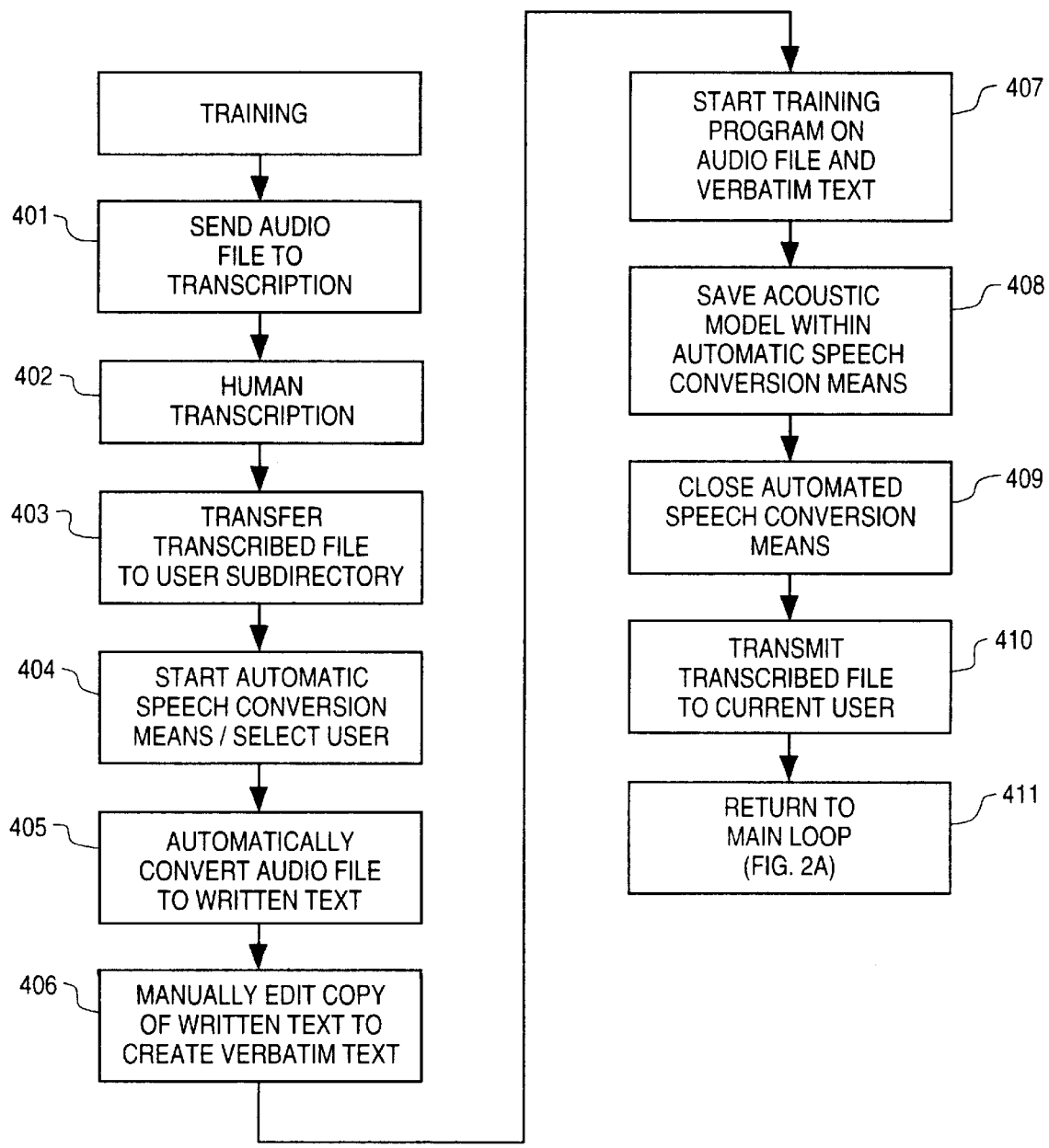
FIG. 2c of the drawings is a flow diagram of the training stage portion of the control means of the present system.
Figure 2D:
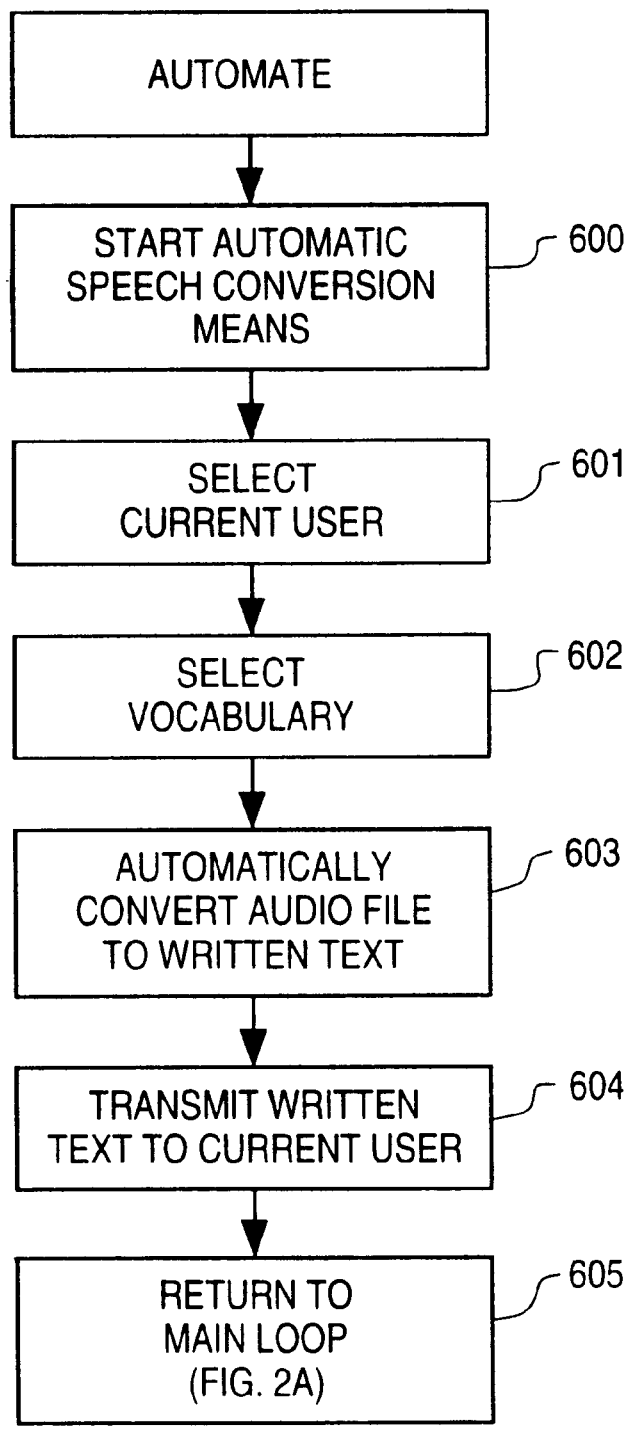
FIG. 2d of the drawings is a flow diagram of the automation stage portion of the control means of the present system.

After a certain number of minutes of training have been conducted for a particular user, that user's training status may be changed from enrollment to training. The border for this change is subjective, but perhaps a good rule of thumb is once Dragon appears to be creating written text with 80% accuracy or more, the switch between states can be made. Thus, for such a user the next transcription event will prompt control means 200 into the training state. As shown in FIG. 2*c*, steps 401–403 are the same human transcription steps as steps 301–303 in the enrollment phase. Once the transcribed file is established, control means 200 starts the automatic speech conversion means (or speech recognition program) and selects the current user, step 404. The audio file is fed into the speech recognition program and a written text is established within the program buffer, step 405. In the case of Dragon, this buffer is given the same file handle on very instance of the program. Thus, that buffer can be easily copied using standard operating system commands and manual editing can begin, step 406.

Figure 4:
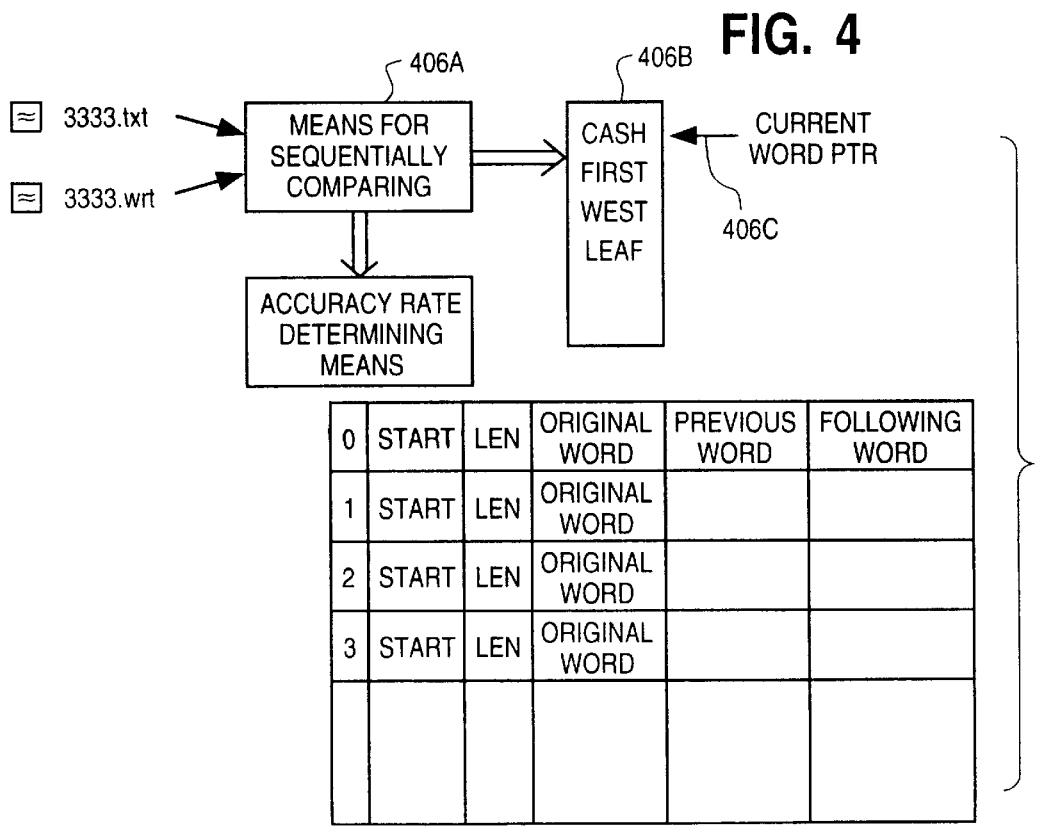
FIG. 4 of the drawings is a block diagram of a portion of a preferred embodiment of the manual editing means.

Manual editing is not an easy task. Human beings are prone to errors. Thus, the present invention also includes means for improving on that task. As shown in FIG. 4, the transcribed file ("3333.txt") and the copy of the written text ("3333.wrt") are sequentially compared word by word 406*a* toward establishing sequential list of unmatched words 406*b* that are culled from the copy of the written text. This list has a beginning and an end and pointer 406*c* to the current unmatched word. Underlying the sequential list is another list of objects which contains the original unmatched words, as well as the words immediately before and after that unmatched word, the starting location in memory of each unmatched word in the sequential list of unmatched words 406*b* and the length of the unmatched word.

Figure 5:
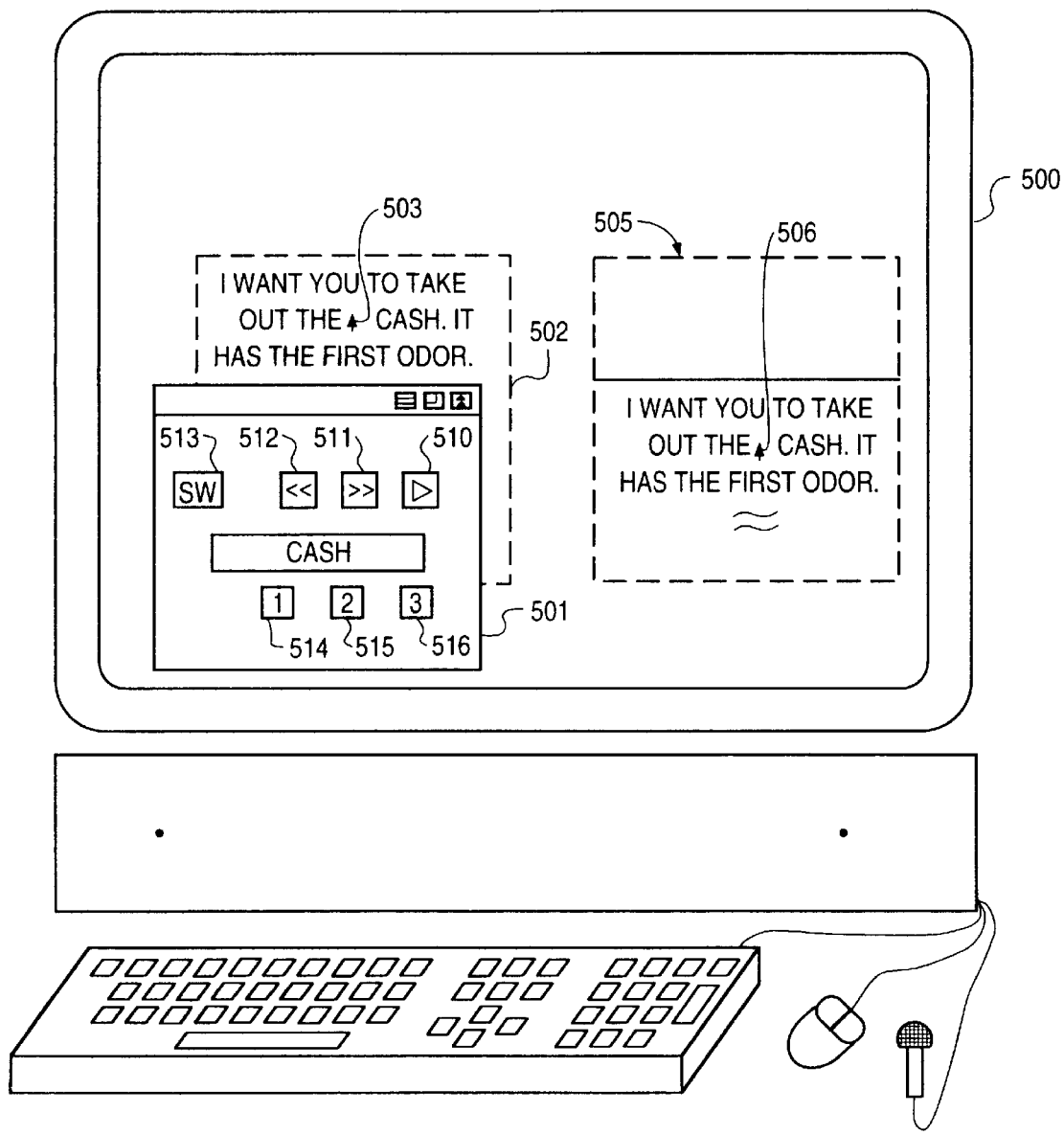
FIG. 5 of the drawings is an elevation view of the remainder of a preferred embodiment of the manual editing means.

As shown in FIG. 5, the unmatched word pointed at by pointer 406*c* from list 406*b* is displayed in substantial visual isolation from the other text in the copy of the written text on a standard computer monitor 500 in an active window 501. As shown in FIG. 5, the context of the unmatched word can be selected by the operator to be shown within the sentence it resides, word by word or in phrase context, by clicking on buttons 514, 515, and 516, respectively.

Associated with active window 501 is background window 502, which contains the copy of the written text file. As shown in background window 502, a incremental search has located (see pointer 503) the next occurrence of the current unmatched word "cash." Contemporaneously therewith, within window 505 containing the buffer from the speech recognition program, the same incremental search has located (see pointer 506) the next occurrence of the current unmatched word. A human user will likely only being viewing active window 501 activate the audio replay from the speech recognition program by clicking on "play" button 510, which plays the audio synchronized to the text at pointer 506. Based on that snippet of speech, which can be played over and over by clicking on the play button, the human user can manually input the correction to the current unmatched word via keyboard, mousing actions, or possibly even audible cues to another speech recognition program running within this window.

In the present example, even if the choice of isolated context offered by buttons 514, 515 and 516, it may still be difficult to determine the correct verbatim word out-of-context, accordingly there is a switch window button 513 that will move background window 502 to the foreground with visible pointer 503 indicating the current location within the copy of the written text. The user can then return to the active window and input the correct word, "trash." This change will only effect the copy of the written text displayed in background window 502.

When the operator is ready for the next unmatched word, the operator clicks on the advance button 511, which advances pointer 406*c* down the list of unmatched words and activates the incremental search in both window 502 and 505. This unmatched word is now displayed in isolation and the operator can play the synchronized speech from the speech recognition program and correct this word as well. If at any point in the operation, the operator would like to return to a previous unmatched word, the operator clicks on the reverse button 512, which moves pointer 406*c* back a word in the list and causes a backward incremental search to occur. This is accomplished by using the underlying list of objects which contains the original unmatched words. This list is traversed in object by object fashion, but alternatively each of the records could be padded such that each item has the same word size to assist in bi-directional traversing of the list. As the unmatched words in this underlying list are read only it is possible to return to the original unmatched word such that the operator can determine if a different correction should have been made.

Ultimately, the copy of the written text is finally corrected resulting in a verbatim copy, which is saved to the user's subdirectory. The verbatim file is also passed to the speech recognition program for training, step 407. The new (and improved) acoustic model is saved, step 408, and the speech recognition program is closed, step 409. As the system is still in training, the transcribed file is returned to the user, as in step 310 from the enrollment phase.

As shown in FIG. 4, the system may also include means for determining the accuracy rate from the output of the sequential comparing means. Specifically, by counting the number of words in the written text and the number of words in list 406*b* the ratio of words in said sequential list to words in said written text can be determined, thus providing an accuracy percentage. As before, it is a matter of choice when to advance users from one stage to another. Once that goal is reached, the user's profile is changed to the next stage, step 211.

Once the user has reached the automation stage, the greatest benefits of the present system can be achieved. The speech recognition software is started, step 600, and the current user selected, step 601. If desired, a particularized vocabulary may be selected, step 602. Then automatic conversion of the digital audio file recorded by the current user may commence, step 603. When completed, the written file is transmitted to the user based on the information contained in the user profile, step 604 and the program is returned to the main loop.

Unfortunately, there may be instances where the voice users cannot use automated transcription for a period of time (during an illness, after dental work, etc.) because their acoustic model has been temporarily (or even permanently) altered. In that case, the system administrator may set the training status variable to a stop automation state in which steps 301, 302, 303, 305 and 310 (see FIG. 2*b*) are the only steps performed.

The foregoing description and drawings merely explain and illustrate the invention and the invention is not limited thereto. Those of the skill in the art who have the disclosure before them will be able to make modifications and variations therein without departing from the scope of the present invention. For instance, it is possible to implement all of the elements of the present system on a single general-purpose computer by essentially time sharing the machine between the voice user, transcriptionist and the speech recognition program. The resulting cost saving makes this system accessible to more types of office situations not simply large medical clinics, hospital, law firms or other large entities.

What is claimed is:

1. A system for substantially automating transcription services for one or more voice users, said system comprising:

> means for receiving a voice dictation file from a current user, said current user being one of said one or more voice users;
>
> an audio player used to audibly reproduce said voice dictation file;
>
> means for manually inputting and creating a transcribed file based on humanly perceived contents of said voice dictation file;
>
> means for automatically converting said voice dictation file into written text;
>
> means for manually editing a copy of said written text to create a verbatim text of said voice dictation file;
>
> means for training said automatic speech converting means to achieve higher accuracy with said voice dictation file of current user; and
>
> means for controlling the flow of said voice dictation file based upon a training status of said current user, whereby said controlling means sends said voice dictation file to at least one of said manual input means and said automatic speech converting means.

2. The invention according to claim 1 wherein said written text is at least temporarily synchronized to said voice dictation file, said manual editing means comprises:

> means for sequentially comparing a copy of said written text with said transcribed file resulting in a sequential list of unmatched words culled from said copy of said written text, said sequential list having a beginning, an end and a current unmatched word, said current unmatched word being successively advanced from said beginning to said end;
>
> means for incrementally searching for said current unmatched word contemporaneously within a first buffer associated with the speech recognition program containing said written text and a second buffer associated with said sequential list; and
>
> means for correcting said current unmatched word in said second buffer, said correcting means including means for displaying said current unmatched word in a manner substantially visually isolated from other text in said copy of said written text and means for playing a portion of said synchronized voice dictation recording from said first buffer associated with said current unmatched word.

3. The invention according to claim 2 wherein said correcting means further includes means for alternatively viewing said current unmatched word in context within said copy of said written text.

4. The invention according to claim 3 wherein said sequential list and said written text each have a respective number of words, said accuracy rate determining means determines the ratio of said number of words in said sequential list to said number of words in said written text.

5. The invention according to claim 4 wherein said training status is based on said accuracy rate.

6. The invention according to claim 1 further including means for determining an accuracy rate for said current user.

7. The invention according to claim 1 wherein said automatic speech converting means comprises a preexisting speech recognition program intended for human interactive use, said automatic speech converting means includes means for automating responses to a series of interactive inquiries from said preexisting speech recognition program.

8. The invention according to claim 7 wherein said training means comprises a preexisting training portion of said preexisting speech recognition program intended for human interactive use, said training means includes means for automating responses to a series of interactive inquiries from said preexisting training portion of said preexisting speech recognition program.

9. The invention according to claim 1 wherein said training means comprises a preexisting training program intended for human interactive use, said training means includes means for automating responses to a series of interactive inquiries from said preexisting training program.

10. The invention according to claim 1 wherein said control means reads and modifies a user profile associated with said current user, each of said user profiles including said training status of said current user.

11. The invention according to claim 10 wherein said training status is selected from the group of pre-enrollment, enrollment, training, automation and stop automation.

12. The invention according to claim 11 when said training status is pre-enrollment said control means further includes means for creating a user identification and acoustic model within said automatic speech converting means.

13. The invention according to claim 11 when said training status is enrollment said control means routes said voice dictation file to said automatic speech converting means and said manual input means, routes said written text and said transcribed file to said manual editing means, routes said verbatim text to said training means and routes said transcribed file back to said current user as a finished text.

14. The invention according to claim 11 when said training status is training said control means routes said voice dictation file to said automatic speech converting means and said manual input means, routes said written text and said transcribed file to said manual editing means, routes said verbatim text to said training means and routes said transcribed file back to said current user as a finished text.

15. The invention according to claim 11 when said training status is automation said control means routes said voice dictation file only to said automatic speech converting means and routes said written text back to said current user as a finished text.

16. The invention according to claim 10 further including means for determining an accuracy rate for said current user, wherein said training status is based in part upon said accuracy rate.

17. The invention according to claim 1 further comprising means for manually selecting a specialized language model.

18. The invention according to claim 17 wherein said manual language model selection means is associated with said voice dictation file receiving means such that said current user can select said specialized language model.

19. The invention according to claim 1 wherein said voice dictation file receiving means is implemented by a general purpose computer.

20. The invention according to claim 19 wherein said general purpose computer implementing said voice dictation file receiving means is remotely located, said voice dictation file receiving means is operably connected to said audio player and said automatic speech conversion means by a computer network.

21. The invention according to claim 19 wherein said general purpose computer implementing said voice dictation file receiving means is remotely located, said general purpose computer further including means for transferring said voice dictation file via the Internet.

22. The invention according to claim 1 wherein said audio player is implemented by a general purpose computer.

23. The invention according to claim 22 wherein said general purpose computer implementing said audio player is remotely located, said audio player is operably connected to said voice dictation file receiving means and said automatic speech conversion means by a computer network.

24. The invention according to claim 22 wherein said general purpose computer implementing said audio player is remotely located, said general purpose computer further including means for receiving said voice dictation file and transmitting said transcribed text via the Internet.

25. An apparatus for substantially simplifying the production of a verbatim text of a voice dictation recording based upon a transcribed file produced by a human transcriptionist and a written text produced by a speech recognition program, wherein said written text is at least temporarily synchronized to said voice dictation recording, said apparatus comprising:

means for sequentially comparing a copy of said written text with said transcribed file resulting in a sequential list of unmatched words culled from said copy of said written text, said sequential list having a beginning, an end and a current unmatched word, said current unmatched word being successively advanced from said beginning to said end;

means for incrementally searching for said current unmatched word contemporaneously within a first buffer associated with the speech recognition program containing said written text and a second buffer associated with said sequential list; and means for correcting said current unmatched word in said second buffer, said correcting means including means for displaying said current unmatched word in a manner substantially visually isolated from other text in said copy of said written text and means for playing a portion of said synchronized voice dictation recording from said first buffer associated with said current unmatched word.

26. The invention according to claim 25 wherein said correcting means further includes means for alternatively viewing said current unmatched word in context within said copy of said written text.

27. The invention according to claim 25 wherein said manner substantially visually isolated from other text can be manually selected from the group containing word-by-word display, sentence-by-sentence display, and said current unmatched word display.

28. The invention according to claim 25 further including means for determining an accuracy rate for said current user.

29. The invention according to claim 28 wherein said sequential list and written text each have a respective number of words, said accuracy rate determining means determines the ratio of said number of words in said sequential list to said number of words in said written text.

30. A method for automating transcription services for one or more voice users in a system including a manual transcription station and a speech recognition program, said method comprising the steps of:

establishing a profile for each of the voice users, the profile containing a training status;

receiving a voice dictation file from a current voice user;

choosing the training status of the current voice user from the group of enrollment, training, automated and stop automation;

routing the voice dictation file to at least one of the manual transcription station and the speech recognition program based on the training status;

receiving the voice dictation file in at least one of the manual transcription station and the speech recognition program;

creating a transcribed file at the manual transcription station for each received voice dictation file;

automatically creating a written text with the speech recognition program for each received voice dictation file if the training status of the current user is training or automated;

manually establishing a verbatim file if the training status of the current user is enrollment or training;

training the speech recognition program with an acoustic model for the current user using the verbatim file and the voice dictation file if the training status of the current user is enrollment or training;

returning the transcribed file to the current user if the training status of the current user is enrollment or training; and returning the written text to the current user if the training status of the current user is automated.

31. The invention according to claim 30 wherein said step of manually establishing a verbatim file includes the substeps of:

assisting an operator to establish the verbatim file if the training status of the current user is training by:

sequentially comparing a copy of the written text with the transcribed file resulting in a sequential list of unmatched words culled from the copy of the written text, the sequential list having a beginning, an end and a current unmatched word, the current unmatched word being successively advanced from the beginning to the end;

incrementally searching for the current unmatched word contemporaneously within a first buffer associated with the speech recognition program containing the written text and a second buffer associated with the sequential list; and displaying the current unmatched word in a manner substantially visually isolated from other text in the copy of the written text and playing a portion of the synchronized voice dictation recording from the first buffer associated with the current unmatched word; and correcting the current unmatched word to be a verbatim representation of the portion of the synchronized voice dictation recording.

32. A method for assisting an operator to establish a verbatim file from a written text created by a speech recognition program and a transcribed file created by a human transcriptionist, the method comprising the steps of:

sequentially comparing a copy of the written text with the transcribed file resulting in a sequential list of unmatched words culled from the copy of the written text, the sequential list having a beginning, an end and a current unmatched word, the current unmatched word being successively advanced from the beginning to the end;

incrementally searching for the current unmatched word contemporaneously within a first buffer associated with the speech recognition program containing the written text and a second buffer associated with the sequential list; and displaying the current unmatched word in a manner substantially visually isolated from other text in the copy of the written text and playing a portion of the synchronized voice dictation recording from the first buffer associated with the current unmatched word; and correcting the current unmatched word to be a verbatim representation of the portion of the synchronized voice dictation recording.

* * * * *